Patented Dec. 23, 1941

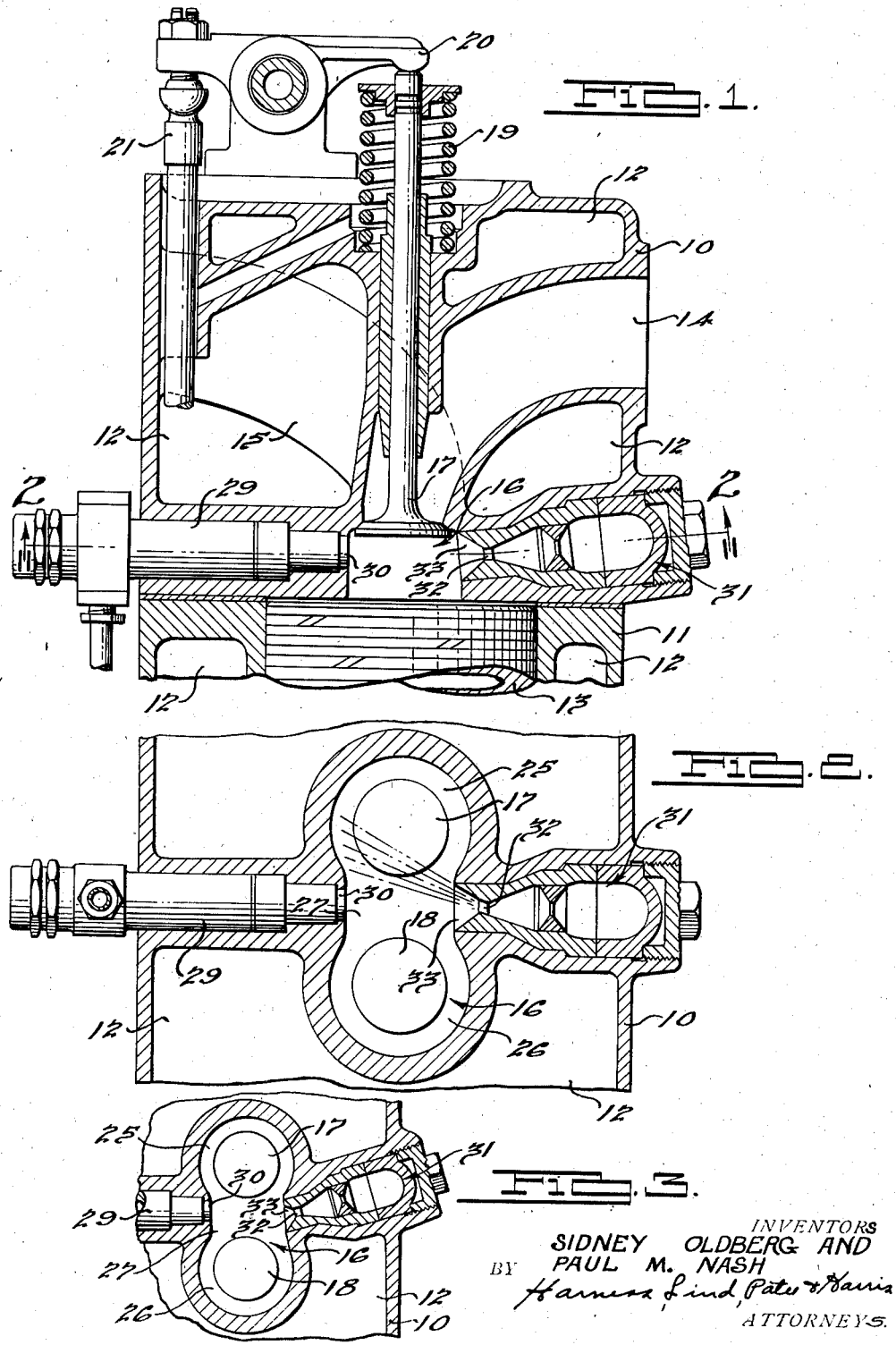

2,267,418

UNITED STATES PATENT OFFICE 2,267,418

FUEL INJECTION TYPE ENGINE

Sidney Oldberg, Birmingham, and Paul M. Nash, Detroit, Mich., assignors to Chrysler Corporation, Highland Park, Mich., a corporation of Delaware Application February 3, 1940, Serial No. 317,100

4 Claims. (Cl. 123—32)

Our present invention relates to internal combustion engines of the type in which a quantity of fuel is injected into a combustion chamber toward the end of the compression stroke of the piston, to be commingled with air which is then compressed to a degree such that ignition will take place due to the heat of compression. The invention has particular reference to a type of engine wherein a fuel injection nozzle is arranged diametrically opposite to and in longitudinal alignment with the throat of an energy cell in which air is mixed with fuel and compressed until combustion is initiated, and from which a stream of ignited fuel mixture and products of combustion issues into a combustion chamber located above the cylinder space. Preferably, the combustion chamber is substantially 8-shaped, with the intermediate portion thereof substantially axially above the cylinder space; and the tip of the fuel nozzle and the throat of the energy cell are preferably arranged at the cusps of the side walls of the combustion chamber between the two lobes thereof, with the axis of the fuel nozzle substantially normal to the longitudinal axis of the combustion chamber and the throat of the energy cell diametrically opposed thereto and in line with the longitudinal axis of the nozzle. Other shapes of combustion chamber may be employed within the purview of the present invention provided that the longitudinal axis of the fuel nozzle is in line with the throat of the energy cell, and that the fuel nozzle and energy cell are advantageously arranged with respect to the combustion chamber in accordance with the present invention.

It is an object of the present invention so to arrange and construct the throat of the energy cell that direct injection of fuel into the energy cell together with entrained or entraining air is assured, and that products of combustion issuing from the energy cell into the combustion chamber are directed into a foil of the combustion chamber and deflected by the side wall thereof away from the injection nozzle. It is a further object of the present invention so to construct and arrange the throat of the energy cell as to cause a whirling stream of ignited fuel mixture rapidly to sweep through the combustion chamber in such manner as to assure atomization of all fuel particles and even firing thereof throughout the combustion chamber, thus preventing engine knocking and the accumulation of partially oxidized, intermediate products of combustion on the injection nozzle tip, cylinder walls, piston head, and other parts. An advantage of the present invention is that the relatively fine orifice of the injection nozzle tip does not become clogged with unburned or partially burned fuel or carbon deposits. A further advantage is that the efficiency of the engine is remarkably increased, in some known cases being increased as much as eight per cent.

The present invention may be more fully understood by reference to the accompanying drawing wherein like numerals refer to like parts throughout.

In the drawing, Fig. 1 is a vertical section through an injection engine having the present invention incorporated therein;

Fig. 2 is a sectional view taken substantially along line 2—2 of Fig. 1 and looking in the direction of the arrows; and, Fig. 3 is a view similar to Fig. 2 but showing a modified arrangement of the present invention.

The injection engine to which the present invention applies comprises a cylinder head 10 suitably attached to a cylinder block 11, the cylinder head and cylinder block being provided with passages 12 for the circulation of a cooling fluid therethrough. The cylinder head is provided with air intake and discharge tubes 14 and 15 extending through the water jacket spaces and terminating in the upper wall of a combustion chamber 16 to be presently described, and the cylinder block is provided with the usual cylinders in which pistons 13 operate. The passages for the admission of air to, and escape of air from, the combustion chamber 16 are controlled by valves 17 and 18, respectively, which are operated by valve springs 19, rocker arms 20, and tappet rods 21, in accordance with usual construction.

The combustion chamber 16 preferably comprises an 8-shaped space having lobes 25 and 26 and a central connecting portion 27, the walls of the foils being substantially circular and the cusps between the foils being somewhat flattened so that the connecting portion 27 is but slightly narrower than the lobe portions. A fuel injection nozzle 29 of known construction is provided in the lower portion of the cylinder head 10 and occupies a position such that its longitudinal axis is substantially coincident with the transverse axis of the combustion chamber with its tip 30 located centrally of the connecting portion 27 so as to direct a stream of fuel laterally across the narrowest portion of the combustion chamber between the two lobes thereof. At the opposite cusp of the combustion chamber there is provided an energy cell 31 having a throat 32 directly in line with the longitudinal axis of the fuel nozzle 30 so that the stream of fuel from the nozzle will be directed into the interior of the energy cell through the throat 32. The longitudinal axis of the energy cell is preferably inclined from the longitudinal axis of the fuel nozzle at an obtuse angle with respect thereto for a purpose to be presently explained. However, the important point to note with respect to the energy cell is that the throat 32 includes a preferably cylindrical passage having substantial length, preferably about one-half of the diameter thereof, the longitudinal axis of which is inclined with respect to the longitudinal axis of the fuel nozzle and the coincident transverse axis of the combustion chamber. Also fuel admission to the throat 32 is effected through a funnel-shaped entrance 33 having the sides thereof so inclined as to permit ejection of the burning fuel mixture from the energy cell 31 through the throat 32 toward a curved wall of one of the foils of the combustion chamber 16, and the longitudinal axis of the tubular passage is so directed that the burning stream of fuel mixture is guided away from the fuel nozzle tip 30.

In the form of the invention shown in Figs. 1 and 2 the longitudinal axis of the energy cell is inclined with respect to the horizontal plane of the top of the cylinder block 11 so that the burning fuel mixture is directed downwardly at an acute angle with respect to the longitudinal axis of the injection nozzle, and the longitudinal axis of the throat 32 is directed laterally so that the burning fuel mixture is directed into one of the foils of the combustion chamber against a portion of its side wall adjacent the tip of the nozzle. In the modification shown in Fig. 3 it is seen that the longitudinal axis of the energy cell and of the tubular portion of throat 32 may be coincident while accomplishing the objects of the present invention, by causing the longitudinal axes thereof to lie at an acute angle horizontally with respect to the transverse axis of the combustion chamber, rather than vertically in line therewith as in the first example. As in the first example the axis of the energy cell may be inclined with respect to the horizontal plane of the top of the cylinder block so that the issuing stream of burning fuel mixture is directed slightly downward into the combustion space so as to sweep spirally downward therethrough to aid in the proper distribution of the ignited fuel mixture throughout the combustion space. Other details of the construction of the energy cell need not be described for an understanding of the present invention.

In either form of the invention the stream of combustion products issuing from the energy cell is caused to flow through an 8-shaped path, first through one lobe and then through the other lobe of the combustion space, thereby causing thorough atomization and ignition of all of the fuel within the combustion space before any of the fuel can contact the top of the piston.

Having described preferred embodiments of the present invention, it should be apparent to those skilled in the art that the same permits of modifications in arrangement and details, such as by changing the number and outline of the lobes, without departing from the spirit of the invention as expressed in the following claims. All such modifications as come within the scope of the claims are considered as being part of our invention.

We claim:

1. In an injection engine, a cylinder and a piston operating therein, a combustion chamber opening into the cylinder, said combustion chamber being substantially 8-shaped and being defined by a pair of lobes connected by opposed cusps, an energy cell opening into the combustion chamber at one of said cusps and in which air may be mixed with fuel and compressed to initiate combustion by the heat of compression, and an injection nozzle opening into the combustion chamber at the other of said cusps for injecting fuel thereinto, said energy cell having a throat including a tubular passage of substantial length and uniform diameter for directing the stream of ignited fuel mixture and products of combustion issuing from the energy cell into said combustion chamber as a relatively dense stream of small diameter, said throat being substantially in line with the longitudinal axis of said injection nozzle so as to facilitate the injection of fuel into said energy cell, and the longitudinal axis of said tubular passage being at an angle with respect to the longitudinal axis of said energy cell and said injection nozzle, respectively, so as to direct the small diameter stream of ignited fuel mixture and products of combustion issuing from said energy cell against the curved portion of said other cusp adjacent said injection nozzle to deflect said stream in a direction away from the tip of said injection nozzle.

2. In an injection engine, a cylinder and a piston operating therein, a substantially 8-shaped combustion chamber overlying and opening into the cylinder, said combustion chamber being defined by a pair of lobes connected by opposed cusps, an energy cell opening into the combustion chamber at one cusp thereof in which air may be mixed with fuel and compressed to initiate combustion by the heat of compression, and an injection nozzle substantially in line with said energy cell and opening into the combustion chamber at the other cusp thereof for facilitating injection of fuel into said energy cell, said energy cell having a throat including a tubular passage of substantial length and uniform diameter, the axis of which is inclined toward a lobe of said combustion chamber for directing a relatively dense, confined stream of ignited fuel mixture and products of combustion from the energy cell against a curved portion of said lobe adjacent to said injection nozzle, said curved portion sloping outwardly away from said injection nozzle so as to initiate flow of said ignited fuel mixture and products of combustion in an 8-shaped path in a direction away from said injection nozzle and through the lobes of said combustion chamber, and said tubular passage being inclined slightly downward so as to cause the stream of ignited fuel mixture and products of combustion to sweep spirally downward from the combustion space into the cylinder.

3. In an injection engine, a cylinder and a piston operating therein, a combustion chamber overlying and opening into the cylinder and having a pair of lobes with opposed cusps between said lobes, an energy cell opening into the combustion chamber at a cusp of said combustion chamber and in which air may be mixed with fuel and compressed to initiate combustion by the heat of compression, and an injection nozzle opening into the combustion chamber at another cusp of said combustion chamber for injecting fuel thereinto, said energy cell having a throat including a tubular passage of substantial length and uniform diameter for directing a jet-like stream of ignited fuel mixture and products of combustion from the energy cell into a lobe of said combustion chamber, the entrance to said throat being substantially in line with the longitudinal axis of said injection nozzle so as to facilitate the injection of fuel into said energy cell, and the longitudinal axis of said tubular passage being so inclined with respect to the longitudinal axis of said injection nozzle as to direct the stream of ignited fuel mixture and products of combustion issuing from said energy cell toward a point on one of said lobes adjacent said injection nozzle but laterally and downwardly spaced from the tip of said injection nozzle, whereby to initiate flow of said ignited fuel mixture and products of combustion in said combustion chamber in a direction away from said injection nozzle.

4. In an injection engine, a cylinder and a piston operating therein, a substantially 8-shaped combustion chamber overlying and opening into the cylinder, said combustion chamber being defined by a pair of lobes connected by opposed cusps, an energy cell opening into the combustion chamber at one cusp thereof in which air may be mixed with fuel and compressed to initiate combustion by the heat of compression, and an injection nozzle opening into the combustion chamber at the other cusp thereof for facilitating the injection of fuel into said energy cell, said energy cell having a throat including a tubular passage, the axis of which is inclined toward a lobe of said combustion chamber for directing a relatively dense, confined stream of ignited fuel mixture and products of combustion from the energy cell against a curved portion of said lobe adjacent to said injection nozzle, said curved portion sloping outwardly away from said injection nozzle so as to initiate flow of said ignited fuel mixture and products of combustion in an 8-shaped path in a direction away from said injection nozzle and through the lobes of said combustion chamber.

SIDNEY OLDBERG.
PAUL M. NASH.